(12) United States Patent
Lee et al.

(10) Patent No.: US 7,688,515 B2
(45) Date of Patent: Mar. 30, 2010

(54) BEAM SPLITTING MODULE AND A LIGHT SOURCE SYSTEM INCORPORATING THE SAME

(75) Inventors: Chia-Chang Lee, Hsinchu (TW); Hung-Ying Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 173 days.

(21) Appl. No.: 12/024,345

(22) Filed: Feb. 1, 2008

(65) Prior Publication Data

US 2008/0273245 A1    Nov. 6, 2008

(30) Foreign Application Priority Data

May 1, 2007    (TW) .............................. 96206962 U

(51) Int. Cl.
*G02B 27/14* (2006.01)
(52) U.S. Cl. ...................... 359/629; 359/811; 359/819; 362/301; 362/346
(58) Field of Classification Search ................. 359/629, 359/811, 819; 362/301, 346
See application file for complete search history.

(56) References Cited

U.S. PATENT DOCUMENTS 3,589,811 A  *  6/1971  Berger ......................... 355/32

* cited by examiner

*Primary Examiner*—Joseph Martinez
(74) *Attorney, Agent, or Firm*—Occhiuti Rohlicek & Tsao LLP

(57) ABSTRACT

A beam splitting module is disposed on a base plate of a light source system, and includes a supporting wall, a beam splitting lens, and a biasing member. The supporting wall has a first wall surface, and is disposed on the base plate such that the first wall surface extends perpendicularly from the base plate. The beam splitting lens has a first lens surface disposed adjacent to the first wall surface of the supporting wall, and a second lens surface opposite to the first lens surface. The biasing member is secured to the base plate, and is disposed adjacent to the second lens surface of the beam splitting lens for urging the beam splitting lens toward the supporting wall such that the first lens surface of the beam splitting lens abuts against the first wall surface of the supporting wall.

19 Claims, 6 Drawing Sheets

BEAM SPLITTING MODULE AND A LIGHT SOURCE SYSTEM INCORPORATING THE SAME

CROSS-REFERENCE TO RELATED APPLICATION

This application claims priority of Taiwanese Application No. 096206962, filed on May 1, 2007.

BACKGROUND OF THE INVENTION

1. Field of the Invention

The invention relates to an optical device, more particularly to a beam splitting module and a light source system incorporating the beam splitting module.

2. Description of the Related Art

A beam splitter is used, for instance, for combining light beams traveling along first and second directions that are different from each other. One light beam traveling along the first direction impinges one side of the beam splitter at a 45-degree angle and passes through the beam splitter to continue traveling along the first direction. Another light beam traveling along the second direction impinges an opposite side of the beam splitter at a 45-degree angle and is reflected by the beam splitter to travel further along the first direction. To achieve the above, the beam splitter is disposed perpendicular to a plane defined by the first and second directions.

As shown in FIG. 1, in a conventional beam splitting module, a beam splitter 11 is supported by two pairs of supporting walls 12 so as to be disposed perpendicular to a base plate 13. Each supporting wall 12 has opposite surfaces 121 that are both perpendicular to the base plate 13. Light beams impinge the beam splitter 11 in directions parallel to the base plate 13.

It is necessary for an article and its mold to have a parting angle of, for instance, 1.5 to 2 degrees, therebetween so as to facilitate mold release when a normal plastic material is used to fabricate the article, i.e., the parting angle must be non-zero. However, since the opposite surfaces 121 of each supporting wall 12 are perpendicular to the base plate 13, a special material for use in zero-parting-angle situations, such as bulk molding compound (BMC), must be used when the supporting walls 12 and the base plate 13 are to be formed integrally. This way, the integrally formed supporting walls 12 and base plate 13 are released from their mold in a parting direction that is parallel to the surfaces 121 of the supporting walls 12.

Due to this perpendicular relationship between the base plate 13 and the supporting walls 12, the fabrication material thereof is limited to the special material for use in zero-parting-angle situations, thereby increasing fabrication cost of the conventional beam splitting module. In addition, since BMC is a thermosetting plastic material, which cannot be recycled after use, the conventional beam splitting module is not environmentally friendly.

SUMMARY OF THE INVENTION

Therefore, one object of the present invention is to provide a beam splitting module with reduced fabrication cost, and a light source system incorporating the beam splitting module.

According to one aspect of the present invention, there is provided a beam splitting module that is disposed on a base plate of a light source system. The beam splitting module includes a supporting wall, a beam splitting lens, and a biasing member. The supporting wall has a first wall surface, and is disposed on the base plate such that the first wall surface extends perpendicularly from the base plate. The beam splitting lens has a first lens surface disposed adjacent to the first wall surface of the supporting wall, and a second lens surface opposite to the first lens surface. The biasing member is secured to the base plate, and is disposed adjacent to the second lens surface of the beam splitting lens for urging the beam splitting lens toward the supporting wall such that the first lens surface of the beam splitting lens abuts against the first wall surface of the supporting wall.

According to another aspect of the present invention, there is provided a light source system that includes a base plate, a first light emitting module, a second light emitting module, and a beam splitting module.

The first light emitting module is disposed on the base plate for providing a first light beam in a first direction. The second light emitting module is disposed on the base plate for providing a second light beam in a second direction perpendicular to the first direction.

The beam splitting module includes a supporting wall, a beam splitting lens, and a biasing member. The supporting wall is connected to the base plate, and has a first wall surface that extends perpendicularly from the base plate in a third direction. The beam splitting lens extends in the third direction, and has a first lens surface disposed adjacent to the first wall surface of the supporting wall, and a second lens surface opposite to the first lens surface. The beam splitting lens is disposed at a 45-degree angle relative to the first direction. The first light beam passes through the beam splitting module and travels along the first direction upon incidence on the beam splitting module, the second light beam is reflected by the beam splitting module and then travels along the first direction upon incidence on the beam splitting module. The biasing member is secured to the base plate, and is disposed adjacent to the second lens surface of the beam splitting lens for urging the beam splitting lens toward the supporting wall such that the first lens surface of the beam splitting lens abuts against the first wall surface of the supporting wall.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. In this regard, directional terminology, such as "top," "bottom, " "front, " "back, " etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
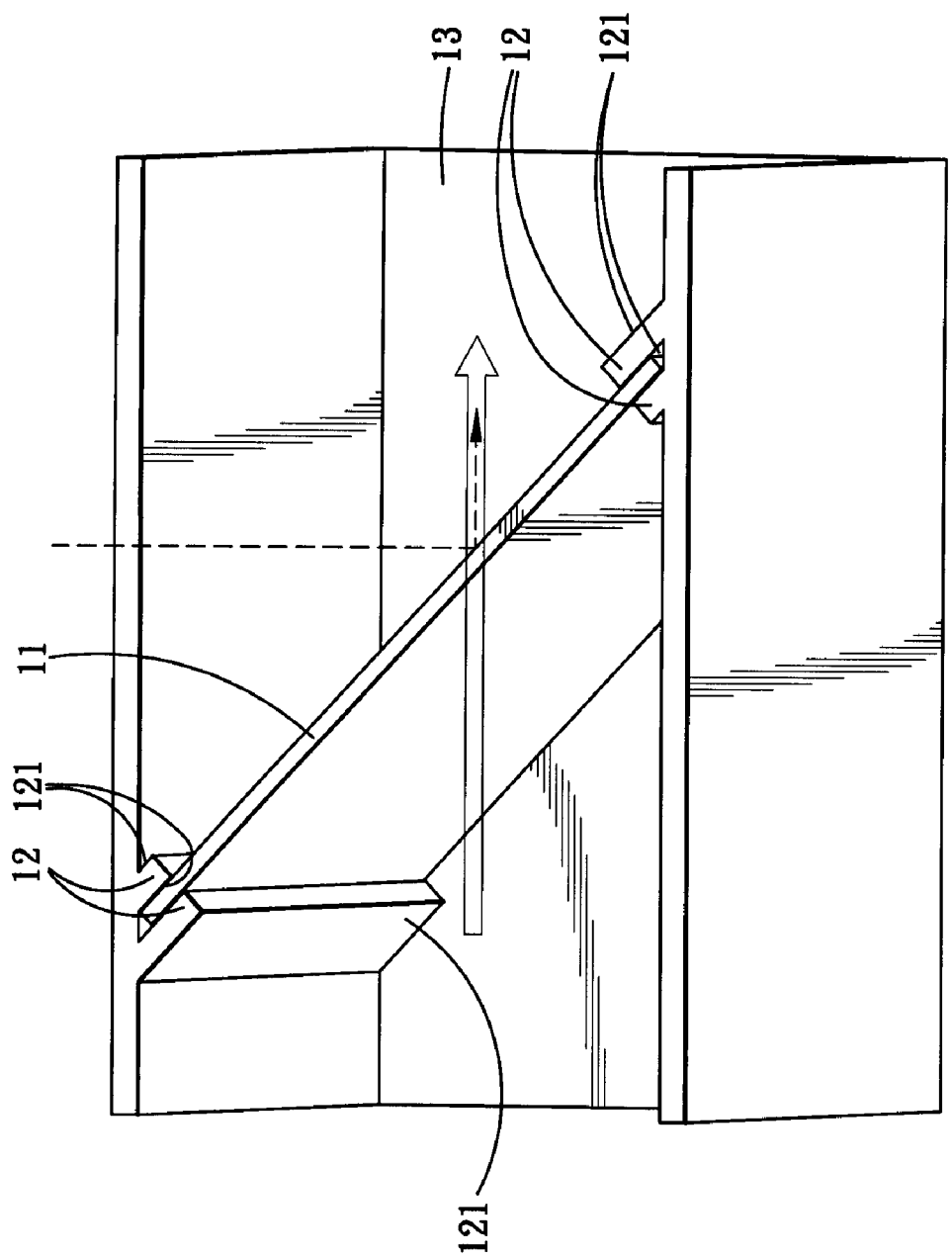
FIG. 1 is a fragmentary perspective view of a conventional beam splitting module.
Figure 2:
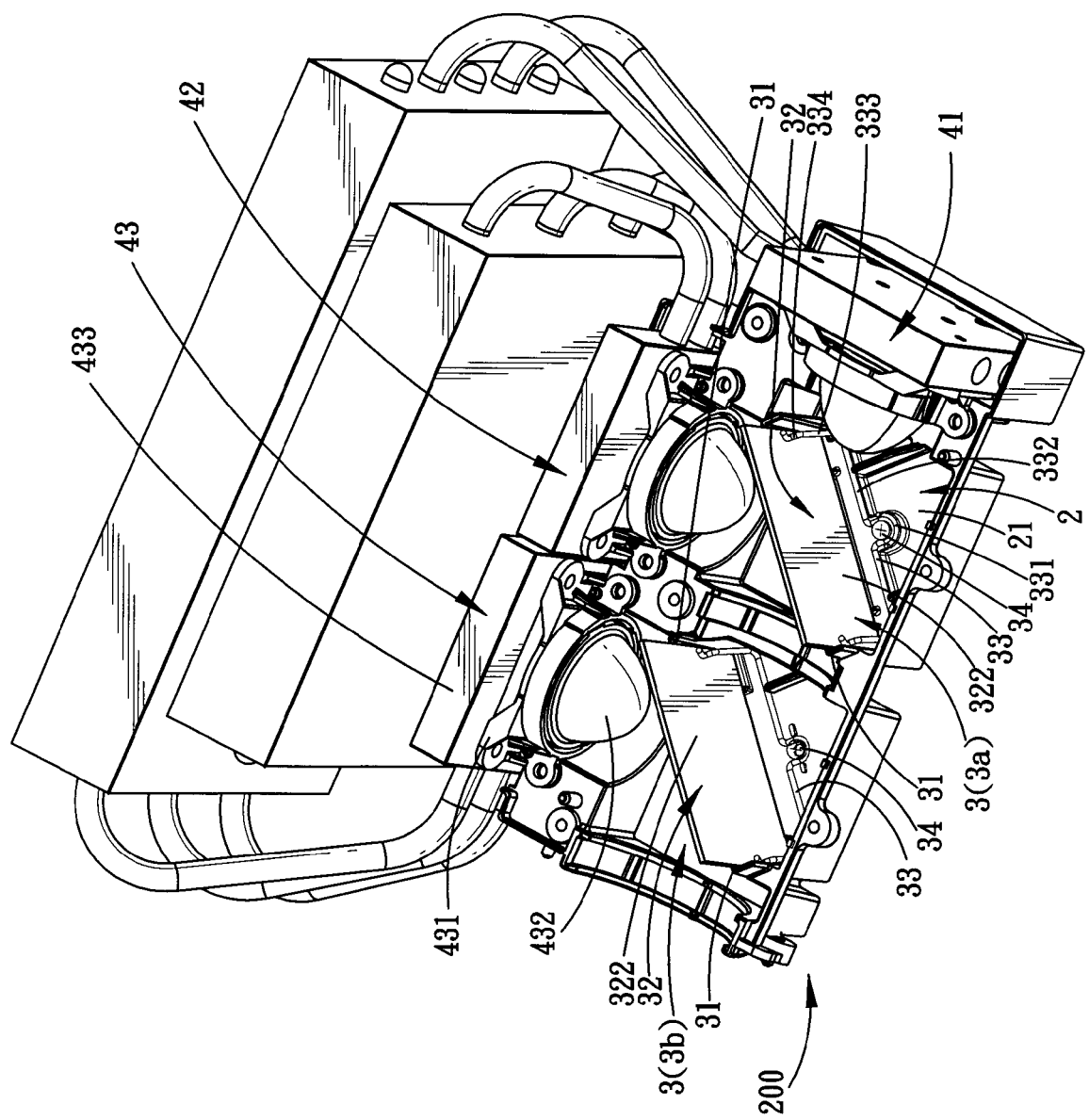
FIG. 2 is a perspective view of the preferred embodiment of a light source system according to the present invention.
Figure 3:
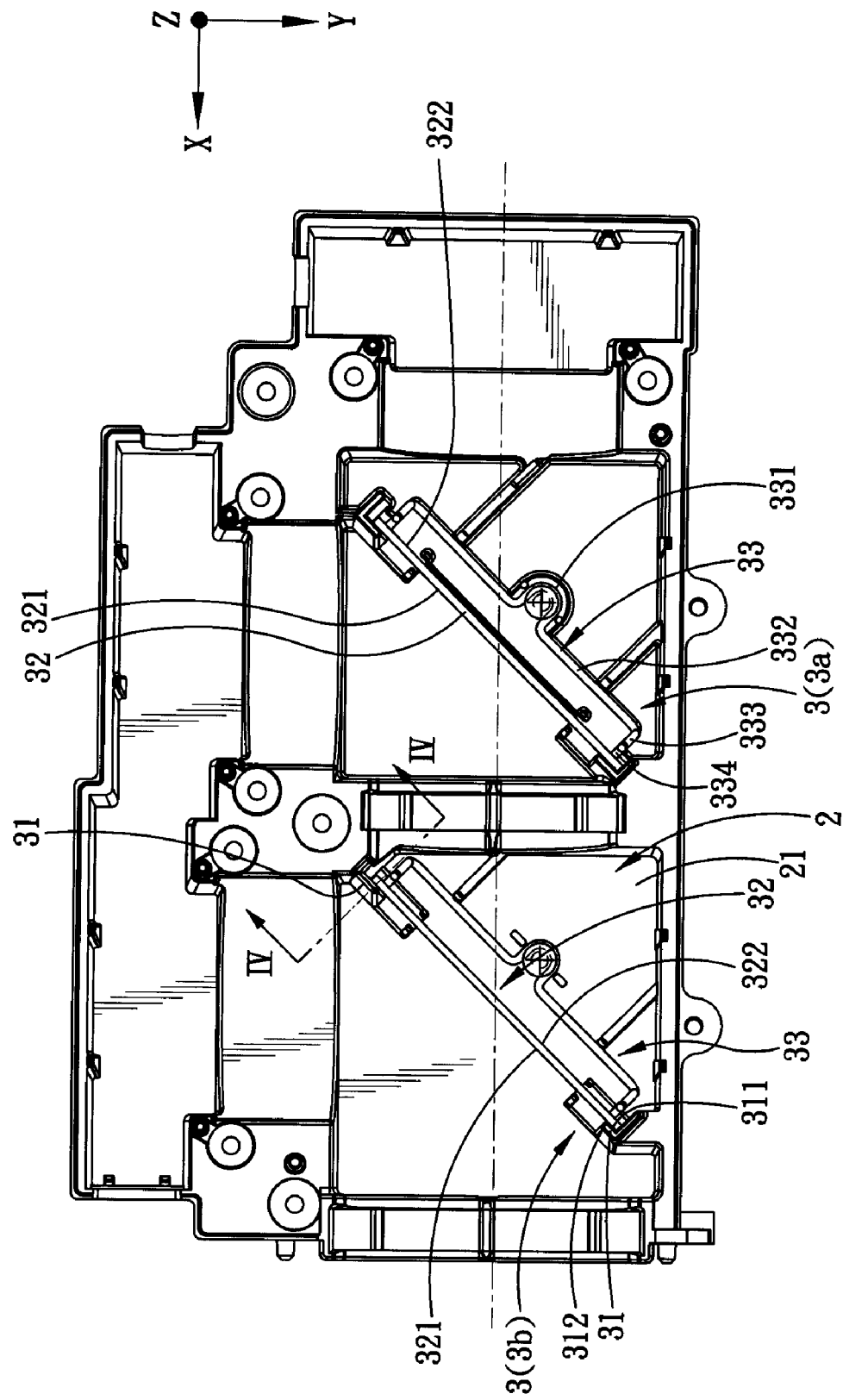
FIG. 3 is a top view of a beam splitting module according to the preferred embodiment.
Figure 4:
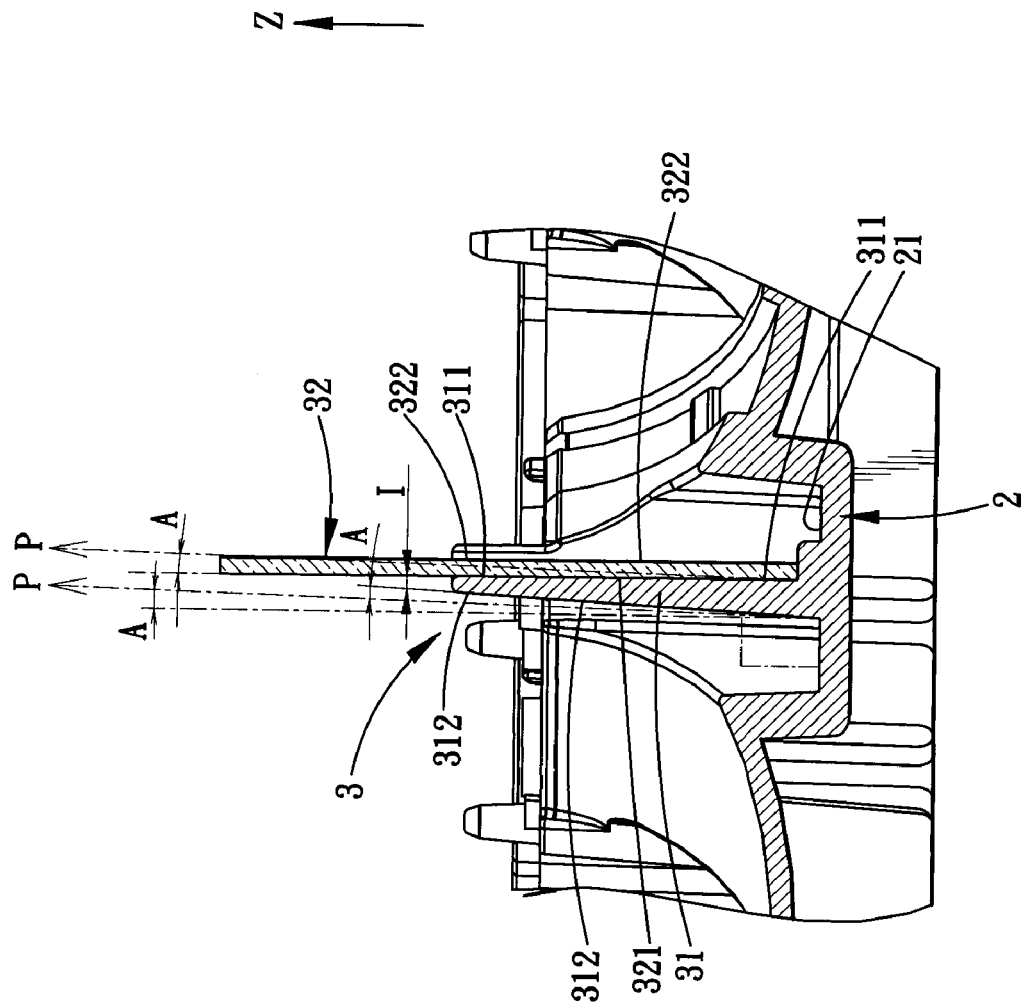
FIG. 4 is a fragmentary sectional view of the beam splitting module taken along line IV-IV in FIG. 3.

As shown in FIG. 2, FIG. 3 and FIG. 4, a light source system 200 according to one preferred embodiment of the present invention includes a base plate 2, a first light emitting module 41, a second light emitting module 42, and a beam splitting module 3.

The first light emitting module 41 is disposed on the base plate 2 for providing a first light beam in a first direction (X).

The second light emitting module 42 is disposed on the base plate 2 for providing a second light beam in a second direction (Y) perpendicular to the first direction (X).

The beam splitting module 3 includes a supporting wall 31, a beam splitting lens 32, and a biasing member 33. The supporting wall 31 is connected to the base plate 2, and has a first wall surface 311 that extends perpendicularly from an upper surface 21 of the base plate 2 in a third direction (Z). The beam splitting lens 32 is disposed perpendicularly to the upper surface 21 of the base plate 2, extends in the third direction (Z), and has a first lens surface 321 disposed adjacent to the first wall surface 311 of the supporting wall 31, and a second lens surface 322 opposite to the first lens surface 321. The beam splitting lens 32 is disposed at a 45-degree angle relative to the first direction (X). The biasing member 33 is secured to the base plate 2, and is disposed adjacent to the second lens surface 322 of the beam splitting lens 32 for urging the beam splitting lens 32 toward the supporting wall 31 such that the first lens surface 321 of the beam splitting lens 32 abuts against the first wall surface 311 of the supporting wall 31.

The first light beam emitted from the first light emitting modules 41 travels along the first direction (X), passes through the beam splitting module 3 upon incidence thereon, and continues traveling along the first direction. The second light beam emitted from the second light emitting modules 42 travels along the second direction (Y), is reflected by the beam splitting module 3 to travel along the first direction (X) upon incidence on the beam splitting module 3.

In this embodiment, the light source system 200 further includes a third light emitting module 43 disposed on the base plate 2 for providing a third light beam in the second direction (Y). In addition, the light source system 200 includes two beam splitting modules 3 (hereinafter referred to as a first and a second beam splitting modules 3a, 3b). The first and second light beams provided by the first and second light emitting modules 41, 42 travel along the first direction (X) away from the first light emitting module 41 upon incidence on the beam splitting lens 32 of the first beam splitting module 3a. The third light beams provided by the third light emitting module 43 travel along the first direction (X) away from the first light emitting module 41 upon incidence on the beam splitting lens 32 of the second beam splitting module 3b.

In this embodiment, the light beams travel along the first direction (X) and the second direction (Y), both of which are parallel to the upper surface 21 of the base plate 2. In addition, each of the beam splitting modules 3 includes two supporting walls 31, a beam splitting lens 32, a biasing member 33 and a screw fastener 34. The first wall surfaces 311 of the supporting walls 31 are coplanar. Each of the supporting walls 31 includes a first wall surface 311 and a second wall surface 312 opposite to the first wall surface 311. Each of the beam splitting lenses 32 comprises a first lens surface 321 and a second lens surface 322 opposite to the first lens surface 321. The first lens surface 321 of the beam splitting lens 32 abuts against the first wall surfaces 311 of the supporting walls 31 at opposite ends thereof.

Figure 5:
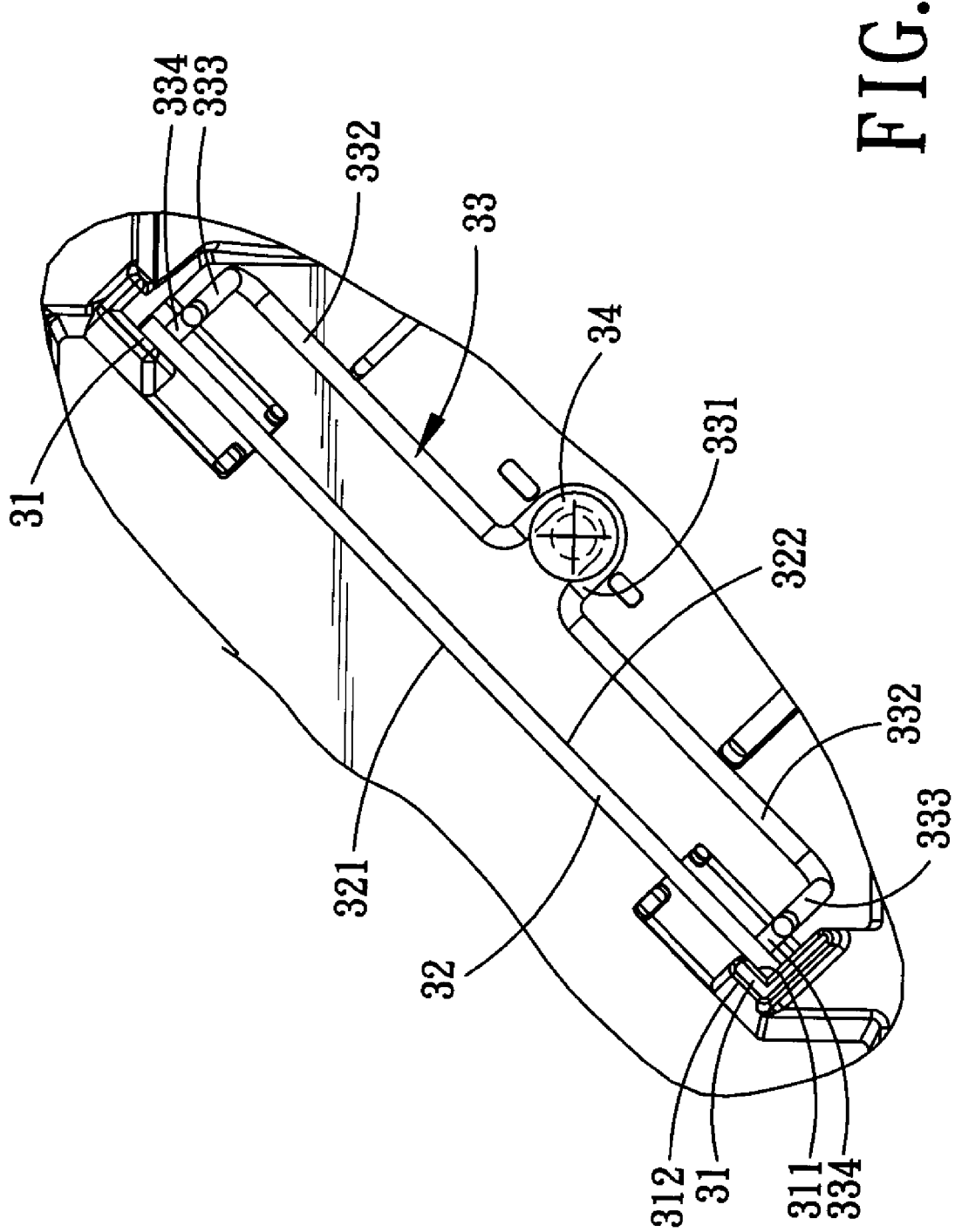
FIG. 5 is a fragmentary top view of the beam splitting module.

Moreover, as shown in FIG. 2 and FIG. 5, the biasing member 33 is a linear spring in this embodiment. The linear spring includes a U-shaped coupling segment 331, two extending segments 332, two inclining segments 333, and two abutting segments 334. The U-shaped coupling segment 331 is secured to the base plate 2. The extending segments 332 extend from opposite ends of the coupling segment 331. The inclining segments 333 extend respectively from the extending segments 332 away from the base plate 2. The abutting segments 334 extend respectively from the inclining segments 333 to abut against the second lens surface 322 of the beam splitting lens 32. In addition, the screw fastener 34 fastens the coupling segment 331 of the biasing member 33 to the base plate 2.

It should be noted herein that although the linear spring serves as the biasing member 33 in this embodiment, other elastic components, such as various types of spring or spring bands, can also serve as the biasing member 33 in other embodiments of the present invention.

Referring to FIG. 4, according to the present invention, with the presence of the supporting walls 31 and the biasing member 33, the beam splitting lens 32 is urged at the second lens surface 322 by the biasing member 33 toward the supporting walls 31, and as a result, the first lens surface 321 of the beam splitting lens 32 is forced to abut against the first wall surfaces 311 of the supporting walls 31, thereby securing the beam splitting lens 32 in a perpendicular position relative to the base plate 2. Consequently, with the above mentioned mechanism, it is only necessary for the surfaces of the supporting walls 31 in contact with the beam splitting lens 32, i.e., the first wall surfaces 311, to be perpendicular to the base plate 2. The other surfaces of the supporting walls 31 not in contact with the beam splitting lens 32, i.e., the second wall surfaces 312, can be designed to be inclining surfaces.

In this embodiment, each of the supporting walls 31 of the beam splitting modules 3 has a thickness that is gradually reduced along the third direction (Z) away from the base plate 2. The second wall surface 312 is slanted relative to the first wall surface 311, i.e., having a non-perpendicular relationship with the base plate 2. The second wall surface 312 cooperates with the first wall surface 311 to define the gradually reduced thickness and an inner angle (I) therebetween, such that the supporting wall 31 has a non-zero parting angle (A) with respect to the first wall surface 311 of the supporting wall 31 that is not larger than one-half of the inner angle (I). The parting angle (A) is defined between the third direction (Z) and a direction of mold release, i.e., a parting direction (P). In this embodiment, the parting angle (A) is equal to one-half of the inner angle (I), but is not limited thereto in other embodiments of the present invention. Preferably, the inner angle (I) is between 3 to 4 degrees, and therefore, the parting angle (A) is preferably between 1.5 to 2 degrees. With the non-zero parting angle (A), the base plate 2 and the supporting walls 31 can be made integrally from a normal plastic material, and are no longer limited to the special material used in zero-parting-angle situations as with the prior art, thereby reducing fabrication cost of each of the beam splitting modules 3 as well as the light source system 200.

Figure 6:
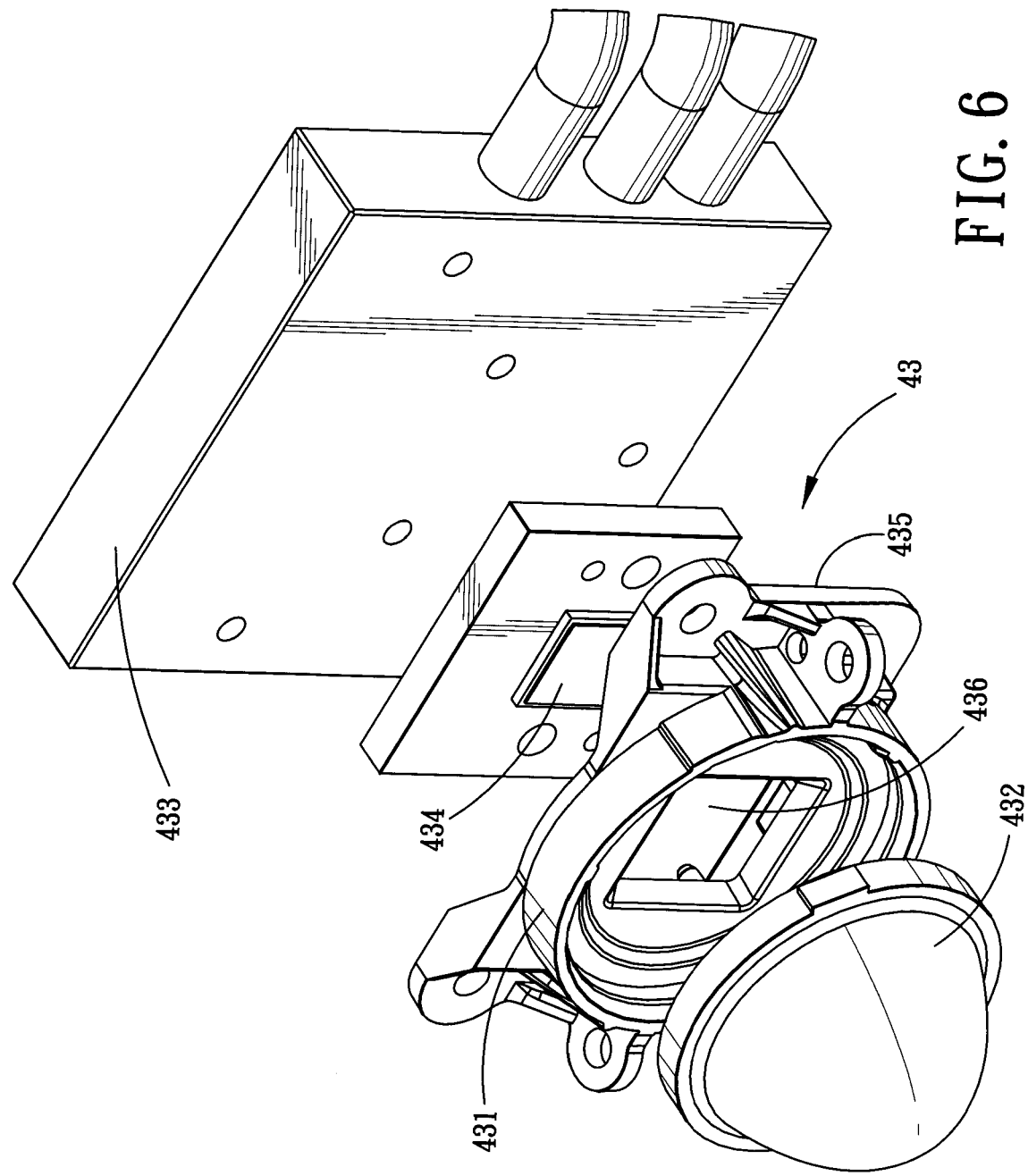
FIG. 6 is an exploded perspective view of a third light emitting module according to the preferred embodiment.

In this embodiment, the first, second and third light emitting modules 41, 42, 43 are identical in structure. As shown in FIG. 2 and FIG. 6, take the third light emitting module 43 for the purpose of illustration, the third light emitting module 43 includes a frame 431, a collimator 432, a heat-dissipating mechanism 433, and a light-emitting diode 434. The frame 431 is coupled to the base plate 2, e.g., via screw fasteners, and has a light-entrance side 435 and a light-exit side 436 opposite to the light-entrance side 435. The collimator 432 is coupled to the frame 431 at the light-exit side 436. The heat-dissipating mechanism 433 is coupled to the frame 431 at the light-entrance side 435. The light-emitting diode 434 is coupled to the heat-dissipating mechanism 433, and provides the third light beam toward the light-entrance side 435 and through the collimator 432. In this embodiment, the first, second and third light beams provided by the first, second and third light emitting modules 41, 42, 43 are red, green and blue respectively, but are not limited thereto in other embodiments of the present invention.

In particular, the first light beam provided by the first light emitting module 41 travels along the first direction (X) and through the beam splitting lens 32 of the first beam splitting module 3a from the second lens surface 322 to the first lens surface 321 thereof, and passes through the beam splitting lens 32 of the second beam splitting module 3b from the second lens surface 322 to the first lens surface 321 thereof.

The second light beam provided by the second light emitting module 42 travels toward the beam splitting lens 32 of the first beam splitting module 3a in the second direction (Y), is reflected by the first lens surface 321 of the beam splitting lens 32 of the first beam splitting module 3a to travel along the first direction (X) away from the first light emitting module 41, and subsequently passes through the beam splitting lens 32 of the second beam splitting module 3b from the second lens surface 322 to the first lens surface 321 thereof.

The third light beam provided by the third light emitting module 43 travels toward the beam splitting lens 32 of the second beam splitting module 3b in the second direction (Y), and is reflected by the first lens surface 321 of the beam splitting lens 32 of the second beam splitting module 3b to travel along the first direction (X) away from the first light emitting module 3a.

The first, second and third light beams are eventually combined to produce a white light beam with appropriate energy proportions of the red, green and blue light beams.

In sum, the light source system 200 and the beam splitting modules 3 thereof according to the present invention secure the beam splitting lens 32 in a perpendicular direction with respect to the base plate 2 (i.e., in the third direction (Z)) by ensuring that the first wall surface 311 of each of the supporting walls 31 is perpendicular to the base plate 2, and by utilizing a biasing member 33 for urging the beam 25 splitting lens 32 toward the supporting walls 31 such that the first lens surface 321 of the beam splitting lens 32 abuts against the first wall surfaces 311 of the supporting walls 31, thereby permitting a non-perpendicular relationship between the second wall surfaces 312 of the supporting walls 31 and the base plate 2. Since each of the second wall surfaces 312 of the supporting walls 31 cooperates with the first wall surface 311 to define a thickness that is gradually reduced in a direction away from the base plate 2, the supporting wall 31 has a non-zero parting angle (A) with respect to the first wall surface 311 that is not larger than one-half of an inner angle (I) defined between the first and second wall surfaces 311, 312. Because of the non-zero parting angle (A), the present invention permits the use of normal plastic materials in manufacturing the supporting walls 31 integrally with the base plate 2. In particular, the integrally made supporting walls 31 and base plate 2 are released from their mold in a parting direction (P) that forms a non-zero angle, i.e., the non-zero parting angle (A), with the third direction (Z) which is perpendicular to the base plate 2. In other words, there is no limitation as to the directional relationship between the second wall surface 312 of each of the supporting walls 31 and the base plate 2, as long as mold release of the supporting walls 31 and the base plate 2 is permitted.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the terms "the invention", "the present invention" or the like do not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam splitting module adapted to be disposed on a base plate of a light source system, the beam splitting module comprising:
a supporting wall having a first wall surface, the supporting wall being disposed on the base plate such that the first wall surface extends perpendicularly from the base plate;
a beam splitting lens disposed perpendicularly to the base plate, and having a first lens surface and a second lens surface opposite to the first lens surface, the first lens surface being disposed adjacent to the first wall surface of the supporting wall; and
a biasing member secured to the base plate, and disposed adjacent to the second lens surface of the beam splitting lens for urging the beam splitting lens toward the supporting wall such that the first lens surface of the beam splitting lens abuts against the first wall surface of the supporting wall;
wherein the supporting wall has a thickness that is gradually in a direction away from the base plate.

2. The beam splitting module as claimed in claim 1, wherein the supporting wall further has a second wall surface opposite to the first wall surface, the second wall surface cooperating with the first wall surface to define the thickness and an inner angle there between, such that the supporting wall has a non-zero parting angle with respect to the first wall surface of the supporting wall that is not larger than one-half of the inner angle.

3. The beam splitting module as claimed in claim 2, wherein the parting angle is equal to one-half of the inner angle.

4. The beam splitting module as claimed in claim 2, wherein the inner angle is between 3 to 4 degrees.

5. The beam splitting module as claimed in claim 1, comprising two supporting walls, the first wall surfaces of the supporting walls being coplanar, the first lens surface of the beam splitting lens abutting against the first wall surfaces of the supporting walls at opposite ends thereof.

6. The beam splitting module as claimed in claim 5, wherein the biasing member is a linear spring that includes a coupling segment secured to the base plate, two extending segments extending from opposite ends of the coupling segment, two inclining segments extending respectively from the extending segments away from the base plate, and two abutting segments extending respectively from the inclining segments to urge the second lens surface of the beam splitting lens.

7. The beam splitting module as claimed in claim 6, further comprising a screw fastener for fastening the coupling segment of the biasing member to the base plate.

8. A light source system comprising: a base plate;
a first light emitting module disposed on the base plate for providing a first light beam in a first direction;
a second light emitting module disposed on the base plate for providing a second source light beam in a second direction perpendicular to the first direction;
and a beam splitting module including:
a supporting wall connected to the base plate, and having a first wall surface that extends perpendicularly from the base plate in a third direction, a beam splitting lens extending in the third direction, and having a first lens surface disposed adjacent to the first wall surface of the supporting wall, and a second lens surface opposite to the first lens surface, the beam splitting lens being disposed at a 45-degree angle relative to the first direction, the first light beam passing through the beam splitting module and traveling along the first direction upon incidence on said beam splitting module, the second light beam being reflected by the beam splitting module to travel along the first direction upon incidence on said beam splitting module, and
a biasing member secured to the base plate, and disposed adjacent to the second lens surface of the beam splitting lens for urging the beam splitting lens toward the supporting wall such that the first lens surface of the beam splitting lens abuts against the first wall surface of the supporting wall.

9. The light source system as claimed in claim 8, further comprising a third light emitting module disposed on the base plate for providing a third light beam in the second direction, the light source system comprising first and second ones of the beam splitting modules, the first and second light beams provided by the first and second light emitting modules traveling along the first direction away from the first light emitting module upon incidence on the beam splitting lens of the first one of the beam splitting modules, the third light beam provided by the third light emitting module traveling along the first direction away from the first light emitting module upon incidence on the beam splitting lens of the second one of the beam splitting modules.

10. The light source system as claimed in claim 9, wherein the first, second and third light beams provided by the first, second and third light emitting modules are red, green and blue, respectively.

11. The light source system as claimed in claim 9, wherein:
the first light beam provided by the first light emitting module travels along the first direction through the beam splitting lens of the first one of said beam splitting modules from the second lens surface to the first lens surface thereof, and passes through the beam splitting lens of the second one of said beam splitting modules from the second lens surface to the first lens surface thereof;
the second light beam provided by the second light emitting module travels toward the beam splitting lens of first one of said beam splitting modules in the second direction, and is reflected by the first lens surface of the beam splitting lens of first one of said beam splitting modules and then travels along the first direction away from the first light emitting module, and passes through the beam splitting lens of the second one of the second beam splitting module from the second lens surface to the first lens surface thereof; and
the third light beam provided by the third light emitting module travels toward the beam splitting lens of the second one of the beam splitting modules in the second direction, and is reflected by the first lens surface of the beam splitting lens of second one of said beam splitting modules and then travels along the first direction away from the first light emitting module.

12. The light source system as claimed in claim 8, wherein each of the light emitting modules includes a frame, a collimator, a heat-dissipating mechanism and a light-emitting diode, the frame being coupled to the base plate, and having a light-entrance side and a light-exit side opposite to the light-entrance side, the collimator coupled to the frame at the light-exit side, the heat-dissipating mechanism coupled to the frame at the light-entrance side, and the light-emitting diode coupled to the heat-dissipating mechanism, and providing the light beams toward the light-entrance side and through the collimator.

13. The light source system as claimed in claim 8, wherein the supporting wall of the beam splitting module has a thickness that is gradually reduced in the third direction away from the base plate.

14. The light source system as claimed in claim 13, wherein the supporting wall of the beam splitting module further has a second wall surface opposite to the first wall surface, the second wall surface cooperating with the first wall surface to define the thickness and an inner angle there between, such that the supporting wall has a non-zero parting angle with respect to the first wall surface of the supporting wall that is not larger than one-half of the inner angle.

15. The light source system as claimed in claim 14, wherein the parting angle is equal to one-half of the inner angle.

16. The light source system as claimed in claim 14, wherein the inner angle is between 3 to 4 degrees.

17. The light source system as claimed in claim 8 wherein the beam splitting module includes two supporting walls, the first wall surfaces of the supporting walls being coplanar, the first lens surface of the beam splitting lens abutting against the first wall surfaces of the supporting walls at opposite ends thereof.

18. The light source system as claimed in claim 17, wherein the biasing member is a linear spring that includes a coupling segment secured to the base plate, two extending segments extending from opposite ends of the coupling segment, two inclining segments extending respectively from the extending segments away from the base plate, and two abutting segments extending respectively from the inclining segments to urge the second lens surface of the beam splitting lens.

19. The light source system as claimed in claim 18, wherein the beam splitting module further includes a screw fastener that fastens the coupling segment of the biasing member to the base plate.

\* \* \* \* \*